March 22, 1932.   B. I. DAY   1,850,924
OIL DISTRIBUTION SYSTEM
Filed Oct. 17, 1928
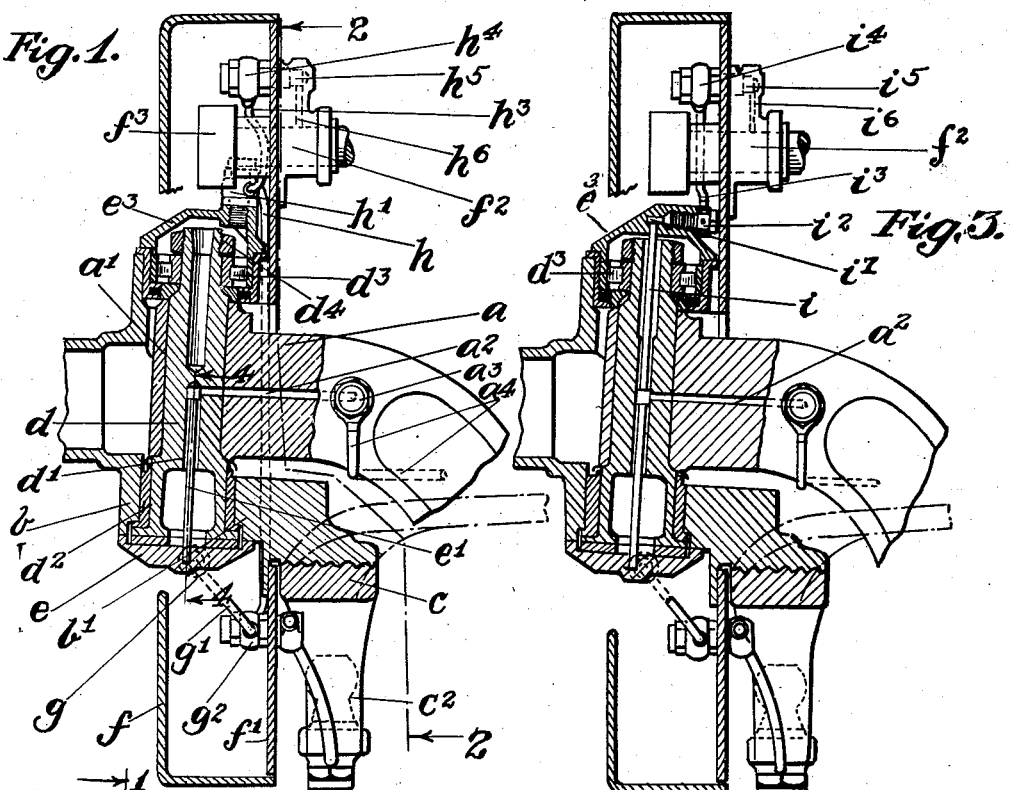
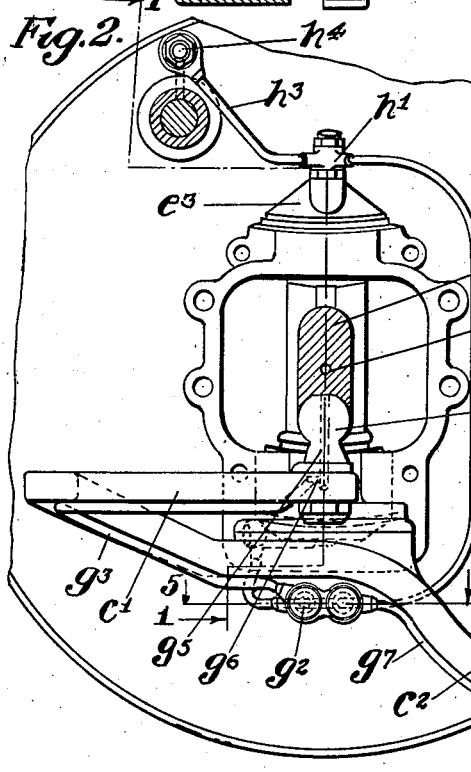
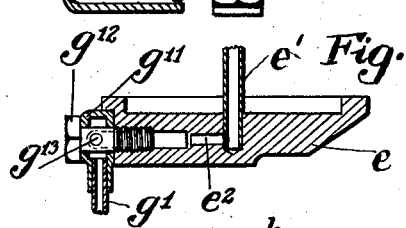
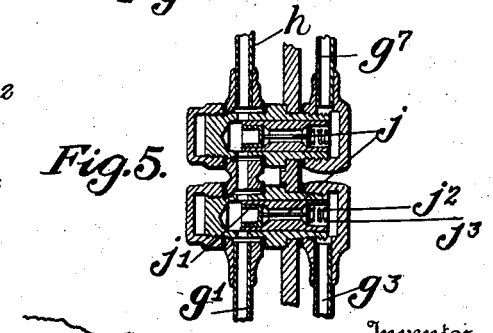
Inventor
Bernard Incledon Day
by Connolly Bros
Attorneys Patented Mar. 22, 1932

1,850,924

UNITED STATES PATENT OFFICE

BERNARD INCLEDON DAY, OF WEST WITTERING, NEAR CHICHESTER, ENGLAND, ASSIGNOR TO ROLLS ROYCE LIMITED, OF DERBY, ENGLAND

OIL DISTRIBUTION SYSTEM

Application filed October 17, 1928, Serial No. 313,125, and in Great Britain October 22, 1927.

This invention relates to oil distribution systems in which oil is conveyed to the various bearings or parts to be lubricated of a machine, for example, an automobile chassis, from a point remote from such bearings or parts, through suitable conduits. In such systems it is necessary that the oil shall be supplied under pressure, as for example, by a plunger in an enclosed vessel containing the oil, and that means be provided to ensure that the required proportion of oil be delivered to each of the various bearings or parts to be lubricated. If the resistances offered to the oil through the various branch conduits are not properly proportioned, the oil travels by the passage offering the least resistance, with the result that some parts are over lubricated and other parts starved of lubrication. Means have been proposed, taking the form of obstructions in the branch conduits, which allow only a small flow of oil to pass, so that the general pressure in the system may be maintained and the oil reach every bearing or part.

Difficulty however has been experienced in such systems in conveying oil under pressure to parts beyond a moving joint such as the steering joints of the front wheels of a motor chassis, where an element, called the pivot, is in fixed relation with the front axle and an element called the stub axle rotates or rocks about such pivot.

In the case of the joint of a motor chassis referred to it is necessary to convey the lubricant to many bearings which are rigid with, and rock with, the stub axle and heretofore this has been effected by providing a chamber or cavity in the upper part of the pivot or other member rigid therewith with a resistance in the conduit supplying the same as above described such chamber having an outlet on the underside thereof, and a chamber in the stub axle with an inlet or orifice at the top thereof which, in all positions of the stub axle relative to the pivot or pin, is in register with the said outlet, oil is fed under pressure by a conduit connected to the general system to the first said chamber or cavity whence it gravitates into the secondly mentioned chamber and from the latter chamber or cavity gravitates through conduits to the various points to be lubricated and which are rigid with the stub axle. Such an arrangement has the objection that the oil tends to gravitate to lower points while higher points are starved of oil. The object of this invention is to enable oil under pressure to be carried beyond a moving joint to the rocking member under pressure, so that it may be forced to the various parts without relying merely on gravitation.

According to this invention a tube mounted on the rotating or rocking element, and at its fixed end in communication with the bearings or parts rigid with such element to be lubricated, is co-axial with and extends into a tunnel formed in or on the main body of the machine co-axial with the axis of rotation of the rotating or rocking member, and to which at a point beyond the end of the tube there is a supply of oil under pressure. The clearance between the tube and the wall of the tunnel is such and the general arrangement of parts such that the leakage between the tube and the wall of the tunnel (inseparable from such an arrangement in the absence of a packing gland) is gauged, and made, to lubricate the bearing of the rocking member.

The accompanying drawings illustrate an example of this invention, as applied to the joint of a stub axle of a motor vehicle and the parts rigid therewith requiring to be lubricated.

Fig. 1 is a section on the line 1—1 of Figure 2, the latter being a sectional elevation on the line 2—2 of Fig. 1. Fig. 3 is a similar view to Fig. 1 but showing another form of the invention. Fig. 4 is a slightly irregular section of the cover $e$ and pipe $g^1$ taken in a plane at right angles to that of Fig. 1. Fig. 5 is a section on line 5—5 of Figure 2. Both Figures 4 and 5 are drawn twice the scale of Figures 1, 2 and 3.

$a$ is the axle terminating in the eyelet $a^1$, $a^2$ is a conduit drilled from a point on the surface of the axle to the interior of the eyelet. $a^3$ is a connection fixed to the surface of the axle over the orifice of the conduit $a^2$ connecting a supply pipe $a^4$ to such conduit. $b$ is the stub axle with an extension $b^1$ to which is bolted the member $c$ comprising the steering arms $c^1$ and $c^2$ to which are respectively bolted the spherical members $c^3$ and $c^4$ being elements of ball and socket joints requiring lubrication. $d$ is the pivot pin made rigid with the axle by any suitable means and formed with a central hole $d^1$, $d^2$ is a bearing bush and $d^3$ a roller bearing on which the stub axle rotates, and $d^4$ a nut to secure the inner roller race in place. $e$ is a member or cover secured by bolts not shown, to the stub axle $b$, $e^1$ is a pipe rigidly mounted in a socket in the member $e$ extending up the hole $d^1$ with a clearance around same, gauged to allow the required amount of oil to pass to the bearing of the stub axle on the pivot. $e^2$ is a conduit drilled through the member $e$ connecting the bottom of the pipe $e^1$ to the outside of the member $e$ and $e^3$ is a cover secured to the stub axle with a perforated and threaded boss to receive the connection $h^1$ hereinafter referred to and described. $f$ is the brake drum fixed to the wheel, $f^1$ the cover thereof secured to the stub axle, $f^2$ is a shaft carrying the cam $f^3$ which operates the brake shoes.

Oil leaking around pipe $e^1$ lubricates the lower pivot bearing, while oil can be conveyed from the orifice in the member $e$ via the union $g$, the conduit $g^1$ to the connection $g^2$, and thence in three directions firstly by the pipe $g^3$ and the drilled conduits $g^5$ and $g^6$ to the surface of the spherical member $c^3$, secondly by the pipe $g^7$ and the drilled conduits $g^9$ and $g^{10}$ to the surface of the spherical member $c^4$, each of the outlets from union $g^2$ to pipes $g^3$ and $g^7$ being suitably restricted so as to limit the quantity of oil passing therethrough, and thirdly via the pipe $h$ to the connection $h^1$ and thence via a restriction within $h^1$ to the roller bearing $d^3$ and also via the pipe $h^3$ to the restricted connection $h^4$ and the drilled holes $h^5$ and $h^6$ to the bearings of the cam shaft $f^2$.

Referring to Figure 3 the hole down the centre of the pivot pin extends from end to end thereof. $i$ is a tube rigidly mounted in the cover $e^3$ and extending down the hole in the pivot to within a short distance of the orifice of the drilled conduit $a^2$, there being for part of the length of such tube a small clearance between it and the said hole so as to enable the required quantity of oil to pass through such clearance, pass out of the top of such hole and trickle down to lubricate the roller bearing $d^3$ while oil under pressure passes via the tube $i$, drilled conduit $i^1$, union $i^2$, pipe, $i^3$, union $i^4$, drilled holes $i^5$ and $i^6$ to the bearings of the cam shaft $f^2$. In the arrangement illustrated in Figure 3 the pipe $h$ can be dispensed with. Referring to Fig. 4 the pipe $g^1$ has sweated to it a banjo-shaped internally-recessed fitting $g^{11}$ which is held to the cover $e$ by a set screw $g^{12}$ having a hollow shank and a radial hole $g^{13}$.

Referring to Fig. 5 there is an unrestricted connection between pipe $g^1$ and pipe $h$ but the flow to pipes $g^3$ and $g^7$ is restricted by pins $j$ which are made of sufficiently loose fit to permit the required quantity of oil to pass. The pins are located by means of a small perforated thimble $j^1$ at one end and a small gauze disc $j^2$ held in position by a coil spring $j^3$ at the other end. This particular form of restriction is shown by way of example only and it is not intended to restrict my invention in this way.

It will be realized that with apparatus as described and with the various branches of the system in the main body of the chassis suitably restricted, the oil would be forced under pressure into the hole in the pivot and down the pipes extending therein so that it can be forced under pressure to various points rigid with the stub axle and it is not necessary to adopt any other means for conveying oil upwards against gravitation.

It will be realized that without departing from the principle of this invention the pipe might be secured to the main part of the machine, or in the case of a motor chassis the pivot, and the tunnel formed in the rocking member.

What I claim is:—

A lubricating and oil distributing system for machine parts, comprising a relatively stationary member having an eye at one end, a passage way for the conveyance of oil under pressure, said passageway leading to the interior surface of said eye; a pivot post secured in said eye and provided with an axial bore and with a radial port establishing a communication between the said passageway and said bore; a tube in said axial bore with a gauged clearance around the same for the passage therethrough of oil; a member mounted pivotally on said stationary member, having a bearing on said pivot post lubricated by the oil passing around the tube, and said pivotally mounted member also having joint connections thereon, to which lubricant is led through said tube.

In testimony whereof I hereto affix my signature.

BERNARD I. DAY.